United States Patent
Valera

(10) Patent No.: US 11,036,046 B2
(45) Date of Patent: Jun. 15, 2021

(54) OPTICAL DEVICE FOR USE IN AN AUGMENTED REALITY OR VIRTUAL REALITY DEVICE

(71) Applicant: Wave Optics Ltd, Abingdon (GB)

(72) Inventor: Mohmed Salim Valera, Abingdon (GB)

(73) Assignee: Wave Optics Ltd, Abingdon (GB)

( * ) Notice: Subject to any disclaimer, the term of this patent is extended or adjusted under 35 U.S.C. 154(b) by 0 days.

(21) Appl. No.: 16/644,357

(22) PCT Filed: Aug. 20, 2018

(86) PCT No.: PCT/GB2018/052356
§ 371 (c)(1),
(2) Date: Mar. 4, 2020

(87) PCT Pub. No.: WO2019/048821
PCT Pub. Date: Mar. 14, 2019

(65) Prior Publication Data
US 2020/0341270 A1    Oct. 29, 2020

(30) Foreign Application Priority Data
Sep. 6, 2017   (GB) ..................................... 1714334

(51) Int. Cl.
*G02B 27/01* (2006.01)
*F21V 8/00* (2006.01)

(52) U.S. Cl.
CPC ....... *G02B 27/0101* (2013.01); *G02B 6/0016* (2013.01); *G02B 6/0038* (2013.01); *G02B 2027/0125* (2013.01)

(58) Field of Classification Search
CPC ........................... G02B 6/0016; G02B 6/0038; G02B 27/0101; G02B 27/4272
See application file for complete search history.

(56) References Cited

U.S. PATENT DOCUMENTS 7,206,107 B2 *   4/2007   Levola ............... G02B 27/4205
                                                   359/34
8,233,204 B1     7/2012   Robbins et al.
(Continued)

FOREIGN PATENT DOCUMENTS

CN       106371222       2/2017
GB        2508661        6/2014
(Continued)

OTHER PUBLICATIONS

International Search Report and Written Opinion dated Nov. 27, 2018 for international application PCT/GB2018/052356.

*Primary Examiner* — Daniel Petkovsek
(74) *Attorney, Agent, or Firm* — Stoel Rives LLP

(57) ABSTRACT

An optical device or display is disclosed for use in an augmented reality or virtual reality device. The display includes a waveguide (2), an output element (4) and a plurality of input diffraction gratings (6, 8, 10, 12). Light from a plurality of projectors (16, 18, 20, 22) is diffracted by the input gratings (6, 8, 10, 12) so that it is coupled into the waveguide (2) by total internal reflection. The input gratings (6, 8, 10, 12) are provided in a staggered configuration in relation to the output element (4), with respect to a y-axis. Each input grating is adjacent another input grating that has a different separation distance from the output element (4). This can improve the evenness of illumination from the output element (4).

8 Claims, 2 Drawing Sheets

(56) References Cited

U.S. PATENT DOCUMENTS

| | | | |
|---|---|---|---|
| 8,817,350 B1 * | 8/2014 | Robbins | G02B 27/0149 |
| | | | 359/15 |
| 9,335,604 B2 * | 5/2016 | Popovich | G02F 1/292 |
| 10,191,288 B2 * | 1/2019 | Singer | G02B 27/0172 |
| 10,254,454 B2 * | 4/2019 | Klug | G02B 5/1809 |
| 10,254,536 B2 * | 4/2019 | Yeoh | G02B 6/10 |
| 10,755,481 B2 * | 8/2020 | Schowengerdt | G02B 27/0955 |
| 2003/0210467 A1 | 11/2003 | Song | |
| 2006/0126142 A1 | 6/2006 | Choi | |
| 2015/0125109 A1 | 5/2015 | Robbins et al. | |

FOREIGN PATENT DOCUMENTS

| | | | | |
|---|---|---|---|---|
| GB | 2577327 A * | 3/2020 | | G02B 27/0081 |
| WO | 2016020643 | 2/2016 | | |
| WO | 2017015302 | 1/2017 | | |
| WO | 2017162999 | 9/2017 | | |
| WO | WO 2020178545 A1 * | 9/2020 | | G02B 27/00 |

* cited by examiner

OPTICAL DEVICE FOR USE IN AN AUGMENTED REALITY OR VIRTUAL REALITY DEVICE

RELATED APPLICATIONS

This application is a national stage filing under 35 U.S.C. § 371 of International Patent Application No. PCT/GB2018/052356, filed Aug. 20, 2018, which claims priority to GB1714334.8, filed Sep. 6, 2017, each of which is incorporated by reference herein in its entirety.

The present invention relates to an optical device for use with an augmented reality or virtual reality device. In particular, the invention relates to a wide screen display for an augmented reality device such as a head-up display.

In an augmented reality device a transparent waveguide is provided in front of a user's eye or eyes. A light projector transmits light towards the waveguide. Light can be coupled into the waveguide by an input diffraction grating. Light then propagates within the waveguide by total internal reflection and an output diffraction grating couples light out of the waveguide and towards a viewer. In use, a viewer can see light from their external environment, transmitted through the transparent waveguide, as well as projected light from the projector. This can provide an augmented reality experience. These devices can be used in head-up displays in a wide variety of applications, including industrial and automotive.

WO2016/020643 describes an optical device for expanding input light in two dimensions in an augmented reality display. In this arrangement an input diffractive optical element is configured to couple input light into a waveguide and two diffractive optical elements are overlaid on one another in or on the waveguide. The lines in each of the overlaid diffractive optical elements are symmetrically angled with respect to rays from the input diffraction grating. Each of the overlaid diffractive optical elements can receive light from the input diffractive optical element and couple it towards the other diffractive optical element in the pair, which can then act as an output diffractive optical element, coupling light out of the waveguide towards a viewer. In this way the optical device can achieve two-dimensional expansion of an input light source while simultaneously coupling light out of the waveguide so that it can be viewed by a user.

It would be desirable to use the technology described in WO2016/020643 in wide screen augmented reality displays. One challenge in developing such a display is to ensure that outcoupled orders can be provided evenly. An object of the present invention is to provide an arrangement that addresses this challenge.

According to an aspect of the invention there is provided an optical device or display for use in an augmented reality or virtual reality device, comprising: a waveguide; a plurality of input diffractive optical elements configured to couple light into the waveguide; an output element configured to receive light from the plurality of input diffractive optical elements in the direction of a first axis, wherein the output element includes two diffractive optical elements overlaid on one another in or on the waveguide, wherein each of the two diffractive optical elements is configured to receive light from the input diffractive optical element and couple it towards the other diffractive optical element which can then act as an output diffractive optical element providing outcoupled orders towards a viewer; wherein the plurality of input diffractive optical elements are provided at at least two respective positions with respect to the first axis.

In this way, light from respective input diffractive optical elements can encounter the output element at different positions with respect to the first axis. This can advantageously improve the evenness with which outcoupled orders can be provided towards a viewer. Preferably, for light from a first input diffractive optical element, outcoupled orders do not coincide with outcoupled orders for light from a second input diffractive optical element.

Preferably first and second separation distances are provided on the first axis between the output element and respective input diffractive optical elements. In this way, a gap can be provided between an input diffractive optical element and the output element. In this way, light from the input diffractive optical element can totally internally reflect in the waveguide between the input diffractive optical element and the output element. It is conceivable that the first or second separation distance could be zero in some embodiments. In another arrangement, one of the first and second separation distances is approximately equal to the total internal reflection period in the waveguide.

The plurality of input diffractive optical elements may be provided in a staggered configuration so that adjacent input diffractive optical elements are provided in first and second positions with respect to the first axis. In some arrangements, therefore, first and second separation distances may be provided sequentially for input diffractive optical elements along the width of the waveguide. Advantageously this can allow gaps between outcoupled orders created from a first input diffractive optical element to be filled by outcoupled orders created from an adjacent input diffractive optical element. In some embodiments there may be more than two separation distances for the input diffractive optical elements.

Light is preferably configured to travel from the plurality of input diffractive optical elements towards the output element by total internal reflection in the waveguide, and a total internal reflection period may be provided. The difference between the at least two respective positions with respect to the first axis is preferably different to the total internal reflection period. Thus, a difference in phase can be established between the outcoupled orders for light from the respective input diffractive optical elements. This can advantageously improve the evenness of the outcoupled orders in the output element.

The difference between the at least two respective positions with respect to the first axis may be approximately half of the total internal reflection period. In this way, the outcoupled orders can be provided substantially out of phase with one another in the output element.

The total internal reflection period may be related to the thickness of the waveguide as well as the angle with which light is diffracted by the input diffractive optical elements. This may also be related to the angle with which light is provided to the input diffractive optical element.

The two overlaid diffractive optical elements in the output element may be provided in or on the waveguide in different planes. The two overlaid diffractive optical elements may be provided on opposing surfaces of the waveguide. The two overlaid diffractive optical elements may be provided in substantially the same plane in the waveguide.

In a preferred arrangement the two overlaid diffractive optical elements can be provided in a photonic crystal.

Embodiments of the invention are now described, by way of example, with reference to the drawings, in which.

Figure 1:
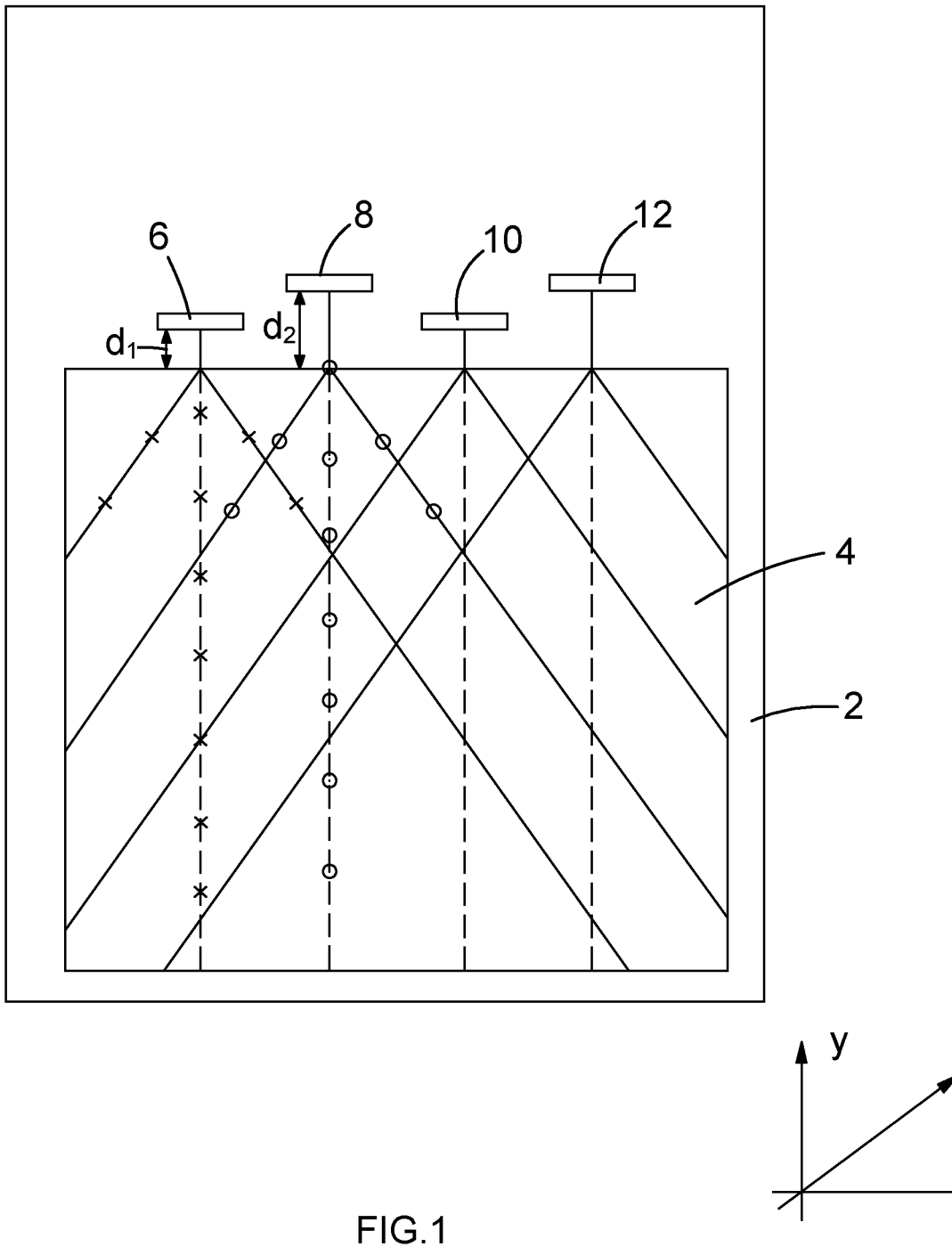
FIG. 1 is a schematic plan view of a display or optical device in an embodiment of the invention.
Figure 2:
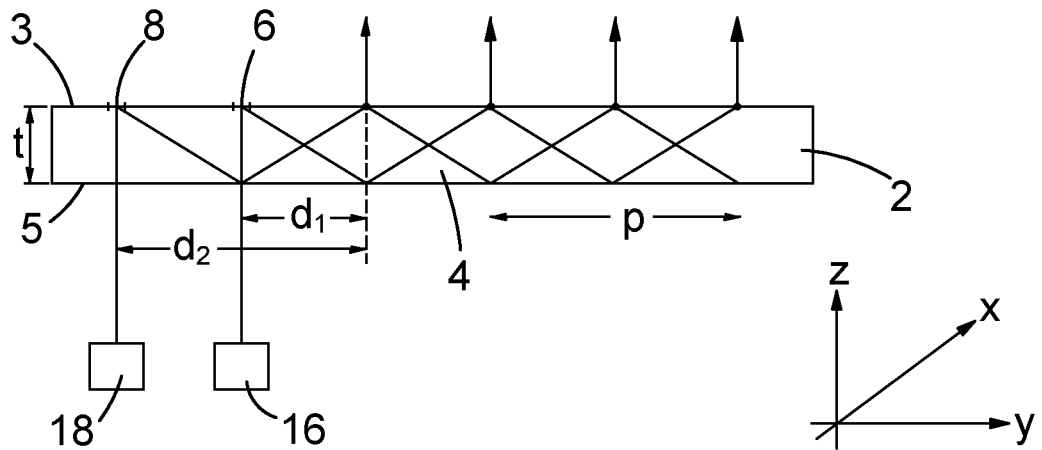
FIG. 2 is a side view of the display shown in FIG. 1.
Figure 3:
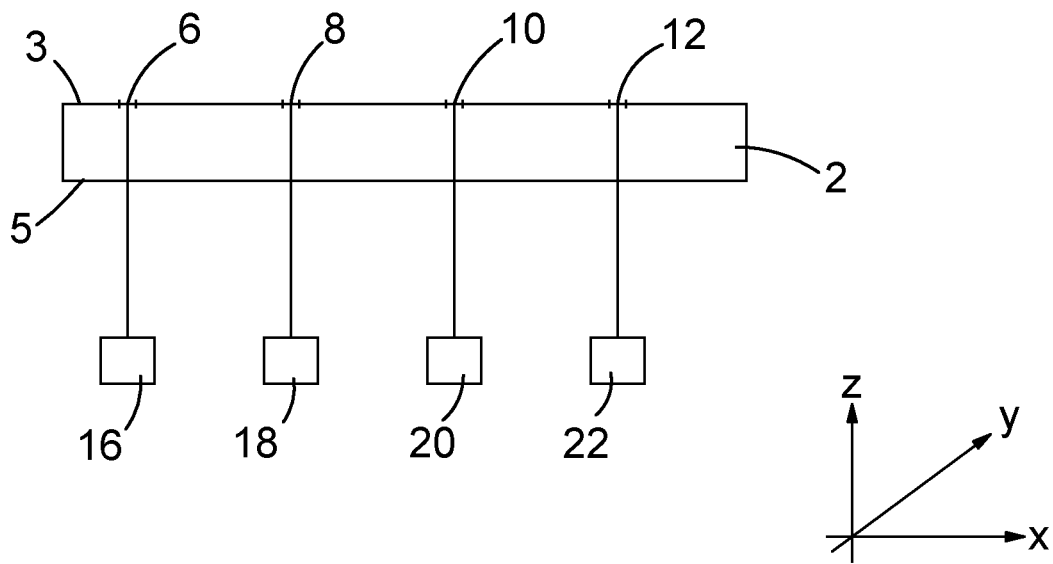
FIG. 3 is an end view of the display shown in FIG. 1.

FIGS. 1-3 show a display or optical device comprising a waveguide 2, an output element 4 and a plurality of input diffraction gratings 6, 8, 10, 12. The waveguide 2 has a first surface 3 and a second surface 5. In this example the input diffraction gratings 6, 8, 10, 12 are provided on the first surface 3. A plurality of projectors 16, 18, 20, 22 provide light to the input gratings 6, 8, 10, 12 along a z-axis, referring to a Cartesian reference frame. Light from the projectors 16, 18, 20, 22 is diffracted by the input gratings 6, 8, 10, 12 in the direction of the y-axis so that it is coupled into the waveguide 2 by total internal reflection. Light from the input gratings 6, 8, 10, 12 travels within the waveguide 2 by total internal reflection until it encounters the output element 4.

The output element 4 comprises two diffractive optical elements that are overlaid on one another in or on the waveguide 2. The lines of each of the overlaid diffractive optical elements are symmetrically angled with respect to the y-axis and the rays from respective input gratings 6, 8, 10, 12. Each of the overlaid diffractive optical elements can receive light from an input grating and couples it towards the other diffractive optical element in the pair, which can then act as an output diffractive optical element, coupling light out of the waveguide towards a viewer. In this way, and as explained in WO2016/020643, the output element 4 can achieve two-dimensional expansion of an input light source while simultaneously coupling light out of the waveguide 2 so that it can be viewed by a user.

Light can either be diffracted or transmitted on first interaction with the output element 4. Thus, a proportion of the light received from each input grating 6, 8, 10, 12 continues to be totally internally reflected within the waveguide 2 until its next interaction with the diffractive structures of the output element 4. This is apparent from FIG. 2, which shows propagation of the transmitted component by total internal reflection in the waveguide 2.

In FIG. 2 the rays are shown as if the diffractive structures for the output element 4 are located on the first surface 3 of the waveguide 2. This is possible, but they could also be located on the second surface 5. In another arrangement, in particular in the case of a photonic crystal, the diffractive structures could be provided in the interior of the waveguide 2.

The input gratings 6, 8, 10, 12 are provided in a staggered configuration in relation to the output element 4, with respect to the y-axis. The first input grating 6 is separated from the output element 4 by a first distance, $d_1$, in the direction of the y-axis. The second input grating 8 is separated from the output element 4 by a second distance, $d_2$, in the direction of the y-axis. The first and second distances are used in turn for input gratings across the width of the waveguide 2. Thus, each input grating is adjacent another input grating that has a different separation distance from the output element 4.

Diffracted rays from one of the input gratings on the first surface 3 of the waveguide are reflected by the second surface 5 of the waveguide 2, and then travel back towards the first surface 3. A total internal reflection period, p, may be defined as the distance along the y-axis between successive points at which the rays interact with the first surface 3 or the second surface 5. The period, p, is related to the thickness, t, of the waveguide 2. The period, p, is also related to the angle at which rays are diffracted from the input gratings 6, 8, 10, 12.

The difference between the first and second differences, $d_2-d_1$, is chosen as half of the total internal reflection period, p/2. In this way, outcoupled orders from rays emanating from adjacent input gratings can be provided out of phase with one another. This is achieved because rays from a first input grating 6 are at a first surface 3 of the waveguide at the same point on the y-axis as rays from a second input grating 8 are at the second surface 5 (and vice-versa).

Light is expanded in the x-y plane when it encounters the output element 4, and rays are coupled out of the output element 4 in the z-axis, towards a viewer. Light is directed from the input gratings 6, 8, 10, 12 in the y-axis towards the output element 4. Rays fan out from an initial point of contact with the output element 4 in a v-shaped cone. As explained in WO2016/020643, at each point of interaction, rays can be diffracted or coupled out of the waveguide 2 towards a viewer. FIG. 1 is a schematic diagram showing the points at which rays in v-shaped cones originating in first and second input gratings 6, 8 are coupled out of the waveguide 2. Outcoupled orders are provided in positions that are out of phase from one another, when considering rays emanating from first and second respective input gratings 6, 8. Thus, where the v-shaped cones intersect, gaps in the outcoupled orders originating from the first input grating 6 can be filled by outcoupled orders originating from the second input grating 8. Advantageously, this can improve the evenness of illumination from the output element 4. The output element 4 can be used in a wide screen augmented reality display, such as a head-up display.

The invention claimed is:

1. An optical device for use in an augmented reality or virtual reality device, comprising:
   a waveguide;
   a plurality of input diffractive optical elements configured to couple light into the waveguide;
   an output element configured to receive light from the plurality of input diffractive optical elements in the direction of a first axis, wherein the output element includes two output diffractive optical elements overlaid on one another in or on the waveguide, wherein each of the two output diffractive optical elements is configured to receive light from the plurality of input diffractive optical elements and couple it towards the other output diffractive optical element which then acts as a final output diffractive optical element providing outcoupled orders towards a viewer;
   wherein the plurality of input diffractive optical elements are provided at least two respective positions along the first axis which are different to one another so that first and second separation distances which are different to one another are provided in the direction of the first axis between the output element and respective input diffractive optical elements.

2. The optical device of claim 1, wherein the plurality of input diffractive optical elements are provided in a staggered configuration so that adjacent input diffractive optical elements are provided in first and second positions along the first axis.

3. The optical device of claim 1, wherein light is configured to travel from the plurality of input diffractive optical elements towards the output element by total internal reflection in the waveguide, and a total internal reflection period is provided, and wherein the difference between the at least two respective positions along the first axis is different from the total internal reflection period.

4. The optical device of claim 3, wherein the difference between the at least two respective positions along the first axis is approximately half of the total internal reflection period.

5. The optical device of claim 1, wherein the two overlaid output diffractive optical elements in the output element are provided in or on the waveguide in different planes which are parallel with the first axis.

6. The optical device of claim 5 wherein the two overlaid output diffractive optical elements are provided on opposing surfaces of the waveguide.

7. The optical device of claim 1, wherein the two overlaid output diffractive optical elements are provided in substantially the same plane in the waveguide, which is parallel with the first axis.

8. The optical device of claim 1, wherein the two overlaid output diffractive optical elements are provided in a photonic crystal.

* * * * *